United States Patent [19]

Fukunaga

[11] Patent Number: 5,375,028
[45] Date of Patent: Dec. 20, 1994

[54] OVERCURRENT PROTECTIVE DEVICE AND DEVICE FOR DETECTING OVERCURRENT

[75] Inventor: Masanori Fukunaga, Fukuoka, Japan

[73] Assignee: Mitsubishi Denki Kabushiki Kaisha, Tokyo, Japan

[21] Appl. No.: 942,152

[22] Filed: Sep. 8, 1992

[30] Foreign Application Priority Data

Jan. 23, 1992 [JP] Japan ................ 4-010014

[51] Int. Cl.$^5$ .................. H02H 3/00; H02H 7/122
[52] U.S. Cl. ........................ 361/93; 361/31; 363/58
[58] Field of Search ............ 361/18, 20, 23, 24, 361/31, 56, 58, 80, 57, 87, 93; 363/56, 58, 98, 29, 132, 17; 257/355

[56] References Cited

U.S. PATENT DOCUMENTS

| | | | |
|---|---|---|---|
| 4,430,682 | 2/1984 | Babsch | 361/31 |
| 4,559,486 | 12/1985 | Spencer et al. | 361/18 |
| 4,626,766 | 12/1986 | Musil | 323/222 |
| 4,777,576 | 10/1988 | Buikema | 363/28 |
| 5,053,940 | 10/1991 | Peppel | 363/58 |
| 5,214,525 | 5/1993 | Sugishima et al. | 363/56 |

FOREIGN PATENT DOCUMENTS 0010980 5/1980 European Pat. Off. .
3222621 12/1983 Germany .
59-159696 9/1984 Japan .
59-159698 9/1984 Japan .

OTHER PUBLICATIONS

Patent Abstracts of Japan, vol. 14, No. 425, Sep. 13, 1990, JP-A-2-164-223, Jun. 25, 1990.

*Primary Examiner*—Jeffrey A. Gaffin
*Assistant Examiner*—Ronald W. Leja
*Attorney, Agent, or Firm*—Oblon, Spivak, McClelland, Maier, & Neustadt

[57] ABSTRACT

Free wheeling diodes are protected against an overcurrent. When counter electromotive forces $E_{VU}$ and $E_{WU}$ established in a tri-phase motor cause regenerative currents $I_{V1}$ and $I_{W1}$ to flow to transistors Q4 and Q6, and to a protection diode D2, it is decided that the protection diode D2 is in overcurrent state. In response to the decision, the transistors Q4 and Q6 are turned off, which allows that regenerative currents $I_{V2}$ and $I_{W2}$ flow in protection diodes D3 and D5 because of the counter electromotive forces $E_{VU}$ and $E_{WU}$. The energies of the regenerative currents $I_{V2}$ and $I_{W2}$ are regenerated at a capacitor C. Thus, since a regenerative current which once passed by only one protection diode is divided into two current flows into two protection diodes, the overcurrent state is terminated.

7 Claims, 9 Drawing Sheets $R_{SQ}, R_{SD}$: CURRENT DETECTION RESISTOR

Mi: OVERCURRENT DETECTION CIRCUIT

Ki: DETECTION DIODE

OVERCURRENT PROTECTIVE DEVICE AND DEVICE FOR DETECTING OVERCURRENT

BACKGROUND OF THE INVENTION

1. Field of the Invention

The present invention relates to overcurrent protection of semiconductor devices for various uses, particularly, for use in a driving circuit for driving a uni-phase or tri-phase motor.

2. Description of the Background Art

FIG. 1 shows a conventional driving circuit for driving a tri-phase motor. In the driving circuit, IGBTs (insulated gate bipolar transistors: hereinafter referred to simply as transistors) Q1 to Q6 serve as switching devices. The transistors are in pairs; a pair Q1-Q2, a pair Q3-Q4 and a pair Q5-Q6, and the transistors in each pair are connected in a standard totem pole relation. The three transistor pairs are bridge-connected between power supplies P and N in a tri-phase configuration. Junctions of the transistors are connected to input terminals of a motor M.

Free wheeling diodes (hereinafter referred to merely as diodes) D1 to D6 are connected reverse-parallel to the transistors Q1 to Q6, respectively. Driving circuits Dr1 to Dr6 are provided for driving and protecting the transistors Q1 to Q6, and give their outputs to the gates of the transistors Q1 to Q6. The driving circuits Dr1 to Dr6, responding to signals received at their input terminals IN1 to IN6, turn on and off the transistors Q1 to Q6 so that operation of the motor M is regulated.

To protect the transistors Q1 to Q6 against an overcurrent developed therein, current transformers CT1 to CT6 and overcurrent detection circuits S1 to S6 are disposed, respectively. The current transformers CT1 to CT6 independently detect forward currents flowing in the transistors Q1 to Q6. Each overcurrent detection circuit finds whether a current in its associated current transformer exceeds a predetermined threshold level. Detecting an overcurrent, the overcurrent detection circuits S1 to S6 generate an inactivate signal which is given to inactivation control terminals B1 to B6 of the driving circuits Dr1 to Dr6, respectively. The overcurrent detection circuits S1 to S6 thus provide feedback, which in turn interrupt the currents to the transistors Q1 to Q6 (i.e., causing turn-off of the transistors).

Overcurrent protection is otherwise achieved by detecting a net overcurrent across the tri-phase circuit in bridge configuration as a whole by a current transformer CT7 for detecting a current on a bus line and an overcurrent detection circuit S7, or alternately, by current transformers CT8 to CT10 for detecting an output current and an overcurrent detection circuit S8, and by thereafter providing feedback simultaneously to the driving circuits Dr1 to Dr6.

These approaches, although being capable of dealing with an overcurrent in the transistors Q1 to Q6 due to a regenerative current from the motor M, are not satisfactory in that an overcurrent across the diode D1, D2 . . . D6 cannot be separately detected. Thus, the diodes D1 to D6 are vulnarable to an overcurrent and accompanying generation of heat, which destroys the diodes D1 to D6.

This is obviated by replacing the diodes D1 to D6 with other types of elements having a larger current capacitance than the switching devices (the transistors Q1 to Q6), but only at the expense of reduction in device size.

SUMMARY OF THE INVENTION

An overcurrent detection device of an aspect of the present invention comprises: a switching element having a control electrode, a first current electrode and a second current electrode, the switching element passing a current from the first current electrode to the second current electrode; a protection diode having a cathode connected to the first current electrode and an anode connected to the second current electrode; a first detection circuit for detecting a current flowing in the protection diode; and a second detection circuit for detecting a current flowing in the switching element.

The first detection circuit preferably includes a first resistor connected in series with said protection diode and means for detecting a voltage drop across said first resistor.

Alternately, the second detection circuit includes a second resistor connected in series with the switching element and means for detecting a voltage drop across the second resistor.

A resistor and detection means may be provided in common to the first and the second detection circuits, the resistor having a terminal connected to the second current electrode and the anode, the detection means provided in common detecting a voltage drop across the resistor provided which is in common.

The first detection circuit may include a first current transformer connected to the protection diode and means for detecting a voltage across the first current transformer.

The second detection circuit may further include a second current transformer connected to the switching element and means for detecting a voltage across the second current transformer.

Further, a current transformer and detection means may be provided in common to the first and the second detection circuits, the current transformer being connected to the second current electrode and the anode, the detection means provided in common detecting a voltage across the current transformer which is provided in common.

In another aspect, the switching element further has a current detection electrode; a current flows from the first current electrode to the current detection electrode; the protection diode further has a detection diode, a cathode of the detection diode being connected to the cathode of the protection diode; and a resistor and detection means are provided in common to the first and the second detection circuits, the resistor having a terminal connected to the anode of the detection diode and the current detection electrode, the detection means provided in common detecting a voltage drop across the resistor which is provided in common.

In still another aspect, the first detection circuit has a detection diode, a first resistor connected in series with the detecting diode and means for detection a voltage drop across the first resistor; and the detection diode and the first resistor are connected in parallel to the protection diode.

In still another aspect, the switching element further has a current detection electrode; a current flows from the first current electrode to the current detection electrode; the second detection circuit has a second resistor connected in series with the current detection electrode and means for detecting a voltage drop across the second resistor.

The present invention also relates to an overcurrent protective device. The device comprises: a first potential point; a second potential point at which a potential is lower than that at the first potential point; a plurality of first current control circuits each having a first current terminal and a second current terminal; second current control circuits provided in the same number as the first current control circuits each having a first current terminal and a second current terminal; and a load having input terminals, the input terminals being provided in the same number as the first current control circuits. In the device, the first current terminal of the first current control circuits are connected to the first potential point in common. The current terminal of the second current control circuits are connected to the second potential point in common. The second current terminals of the first current control circuits are connected to the first current terminals of the second current control circuits and the input terminals of the load. The first and the second current control circuits each has: a switching element including a control electrode, a first current electrode and a second current electrode, the first current electrode being connected to an associated one of the first current terminals, the second current electrode being connected to an associated one of the second current terminals, the switching element passing a current from the first current electrode to the second current electrode; a protection diode having a cathode connected to the first current electrode of the switching element and an anode connected to the second current electrode of the switching element; first detection means for detecting a current in the protection diode, the detection means outputting a first inactivate signal when it has detected a current beyond a predetermined threshold level; second detection means for detecting a current in the switching element, the second detection means outputting a second inactivate signal when it has detected a current beyond a predetermined threshold level; and a driving circuit for controlling operation of the switching element, the driving circuit having a first control terminal, a second control terminal, a third terminal terminal and an output terminal, the first control receiving the first inactivate signal, the second terminal receiving the second inactivate signal, the third control terminal receiving a signal under the control of which the switching element is controlled, the output terminal being connected to the control terminal. Any one of the first current control circuits has the first control terminal thereof connected to the first detection circuits of any other one of the first current control circuits. Any one of the first current control circuits has the second control terminal thereof connected to the second detection circuits of any other one of the first current control circuits. Any one of the second current control circuits has the first control terminal thereof connected to the first detection circuits of any other one of the second current control circuits. Any one of the second current control circuits has the second control terminal thereof connected to the second detection circuits of any other one of the second current control circuits. Any selected one of the driving circuit turns off an associated one of the switching elements in response to either one of the first inactivate signal or the second inactivate signal, the output terminal of the selected one of the driving circuits being connected to the control electrode of the associated one of the switching elements.

Any one of the first current control circuit may have the first control terminal thereof further connected to the first detection circuit thereof. Any one of the second current control circuits may have the first control terminal thereof further connected to the first detection circuit thereof.

The number of the first current control circuits is preferably two or three.

Where there are three first current control circuits, each first detection current circuit has a current transformer and detection means, the current transformer being connected in series with the associated one of the protection diodes, the detection means detecting a current in the current transformer.

Each of the second detection circuits may have a current transformer and detection means, the transformer being connected in series with the associated one of the switching elements, the detection means detecting a current in the current transformer associated therewith.

The load is preferably a motor.

The switching elements are preferably insulated gate bipolar transistors.

The device may further comprises a capacitor connected to the first and the second potential points.

The present invention is also directed to an overcurrent protection method. The method is applicable to a load driving circuit for driving a load. The load driving circuit comprises: a first potential point; a second potential point at which a potential is lower than that at the first potential point; a plurality of first current control circuits each having a first current terminal and a second current terminal; second current control circuits provided in the same number as the first current control circuits each having a first current terminal and a second current terminal; and a load having input terminals, the input terminals being provided in the same number as the first current control circuits. The first current terminal of the first current control circuits are connected to the first potential point in common, the current terminal of the second current control circuits are connected to the second potential point in common. The second current terminals of the first current control circuits are connected to the first current terminals of the second current control circuits and the input terminals of the load. The first and the second current control circuits each have: a switching element including a control electrode, a first current electrode and a second current electrode, the first current electrode being connected to an associated one of the first terminals, the second current electrode being connected to an associated one of the second terminals, the switching element passing a current from the first current electrode to the second current electrode; and a protection diode having a cathode connected to the first current electrode of the switching element and an anode connected to the second current electrode of the switching element. The load driving circuit drives the load by turning on and off the first and the second current control circuits. In the method, when a current beyond a predetermined threshold value is developed in the switching element of any selected one of the first current control circuits and when a current beyond a predetermined threshold value is developed in the protection diode of the selected one of the first current control circuits, the switching element of the selected one of the first current control circuits is turned off. When a current beyond a predetermined threshold value is developed in the switching element of any selected one of the second current control circuits and when a current beyond a predetermined threshold value is developed in the protection diode of the selected one of the second current control circuits, the switching element of the selected one of the second current control circuits is turned off.

In an aspect, the switching element of the selected one of the first current control circuits is turned off when a current beyond a predetermined threshold value is developed only in the protection diode of the selected one of the first current control circuits; and the switching element of the selected one of the first current control circuits is turned off when a current beyond a predetermined threshold value is developed only in the protection diode of the selected one of the second current control circuits.

The load is preferably a motor.

The switching elements are preferably insulated gate bipolar transistors.

A capacitor may be connected to the first and the second potential points.

According to the present invention, a forward current in the protection diodes is detected. If an overcurrent in one of the first current control circuits is sensed by the first detection circuit which is disposed in that first current control circuit, the switching elements of the other first current control circuits are turned off by the driving circuit associated therewith. As a result, a counter electromotive force established by an inductance component of the load such as a motor is given to the second current control circuits, thereby directing a regenerative current to the second current control circuits. That is, by turning on and off the switching elements depending on in which one of the first current control circuits the diode subjected to the overcurrent is disposed, the current path of the regenerative current is changed, whereby the diode subjected to the overcurrent is protected against overcurrent destruction.

Thus, the protection diodes, which are connected reverse-parallel to the switching element, are also provided with the first detection circuits, and it is possible to detect a current in the protection diodes independently of a current in the switching elements. The feature that the detection diodes are connected in parallel to the protection diodes, which allows independent detection of a current in the detection diodes, is especially important since this promises a reduction in the price and the size of the device and enables current detection which does not cause a large power loss.

When a current detected across the protection diodes increases so as to be an overcurrent, the conduction states of the switching elements are changed. This changes the path of a regenerative current, thereby the protection diodes are made current starved. As a result, overcurrent protection of the protection diodes is attained separately from overcurrent protection of the switching elements.

Accordingly, an object of the present invention is to obtain an overcurrent protective device in which diodes as well as transistors are protected against an overcurrent and which enables a reduction in the price and size thereof. Power loss in the overcurrent protective device of the present invention is small. An overcurrent protection method used in such a device is what the present invention aims to obtain. To obtain a device for detecting an overcurrent is also an object of the present invention.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
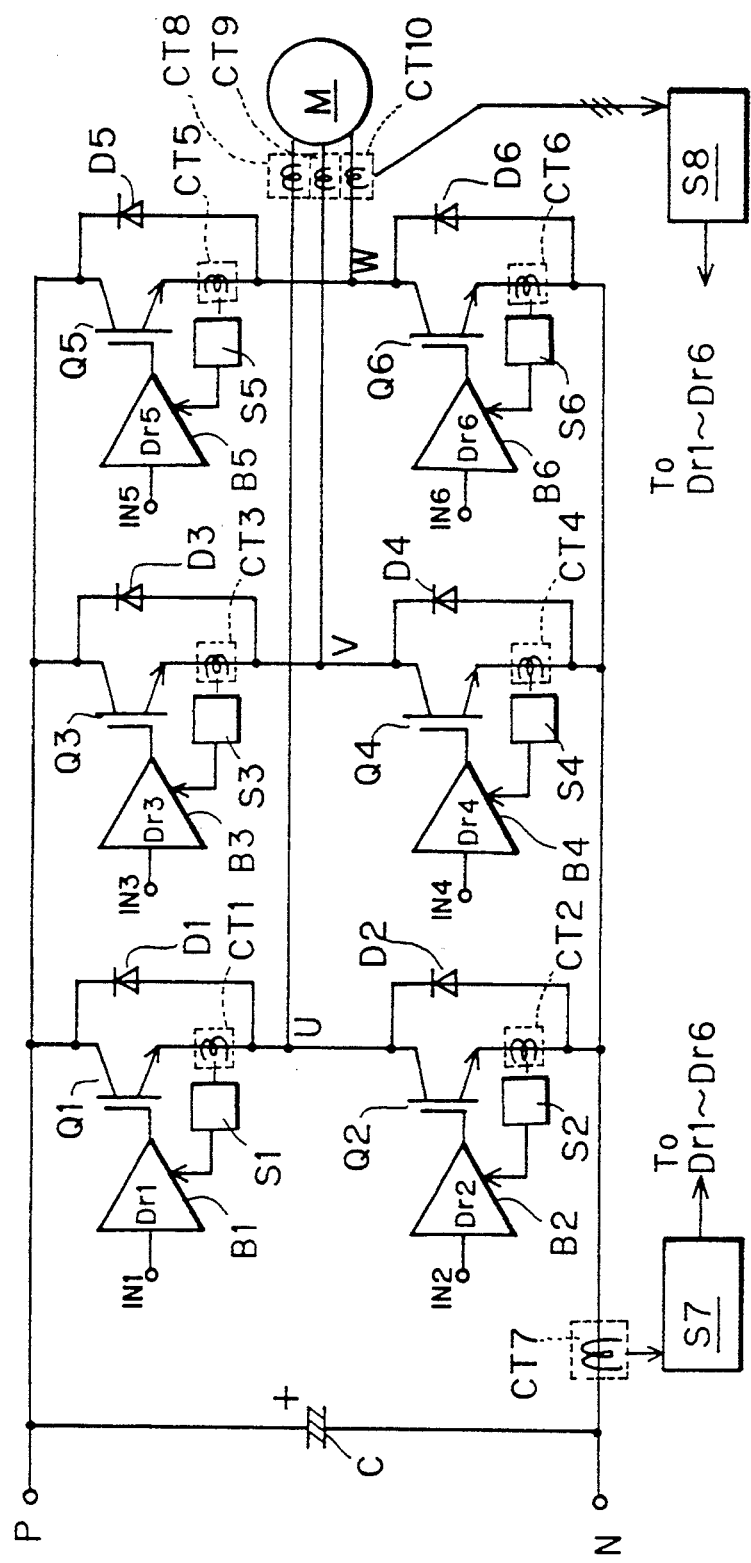
FIG. 1 is a circuitry diagram for explaining a conventional overcurrent protection technique.
Figure 2:
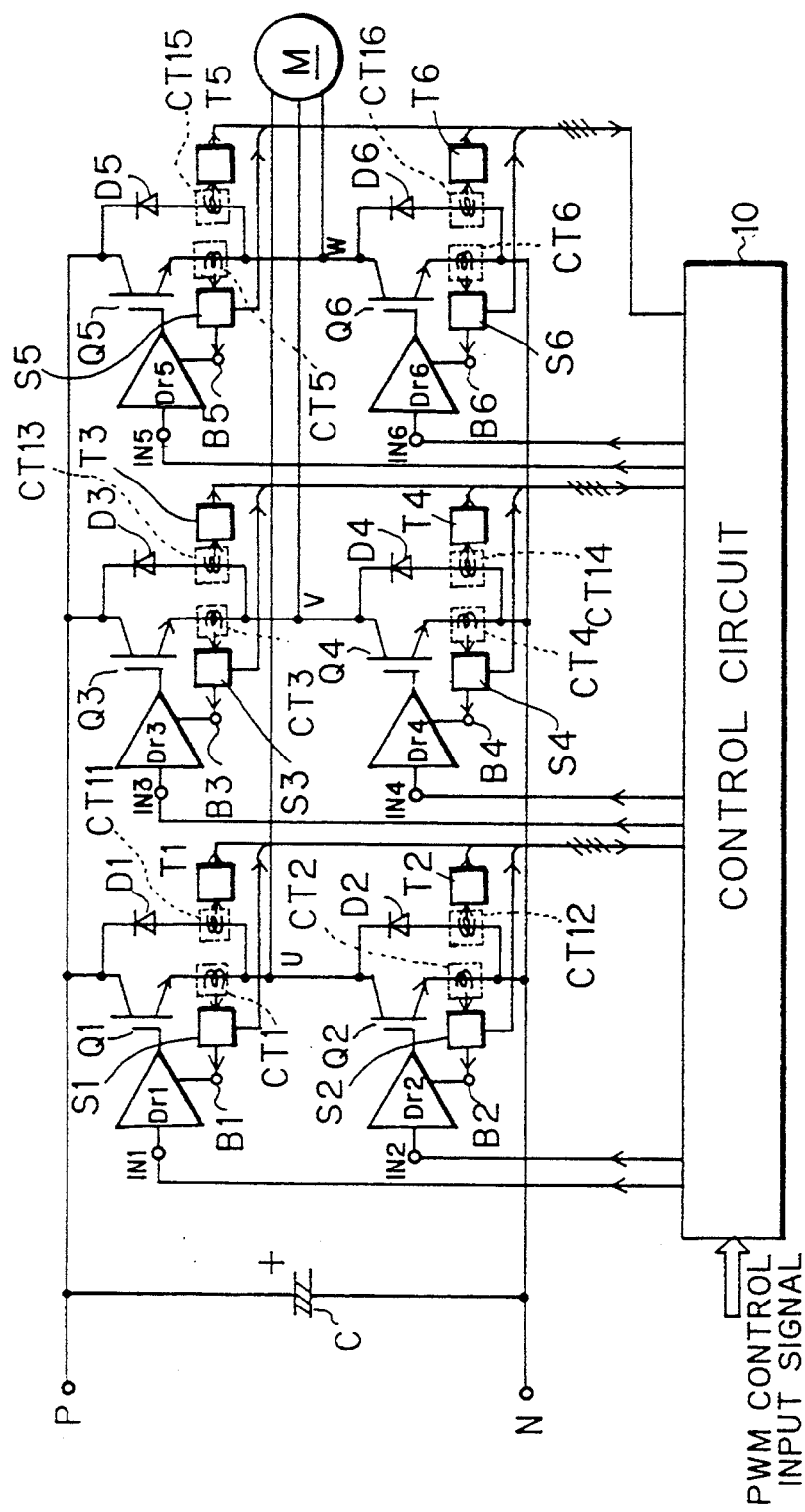
FIG. 2 is a circuitry diagram illustrating a first preferred embodiment of the present invention.

An overcurrent protective circuit according to a first preferred embodiment of the present invention will be described in the following. As shown in FIG. 2, the overcurrent protective circuit includes transistors Q1 to Q6 each serving as a switching device. The transistors are in three pairs; a pair Q1–Q2, a pair Q3–Q4 and a pair Q5–Q6. The transistors in each pair are connected in a standard totem pole relation. The three transistor pairs are connected between power supplies P and N each in a bridge configuration so that the driving circuit is a bridged tri-phase circuit. Diodes D1 to D6 are connected reverse-parallel to the transistors Q1 to Q6, respectively. Driving circuits Dr1 to Dr6 are connected to gates of the transistors Q1 to Q6. A capacitor C is also connected from the power supply P to the power supply N.

current transformers CT1 to CT6 are connected to emitters of the transistors Q1 to Q6, respectively. The current transformers CT1 to CT6 independently detect forward currents in the transistors Q1 to Q6. The current transformers CT1 to CT6 are also connected to overcurrent detection circuits S1 to S6, respectively.

current transformers CT1 to CT16 are connected to anodes of the diodes D1 to D6, respectively. The current transformers CT1 to CT16 independently detect forward currents in the diodes D1 to D6. Overcurrent detection circuits T1 to T6 are connected to the current transformers CT1 to CT16, respectively.

Outputs from the overcurrent detection circuits S1 to S6 and T1 to T6 are fed to a control circuit 10. normal operation, the control circuit 10 generates a PWM (pulse width modulation) control input signal under the control of which signals of "H" or "L" level are given to input terminals IN1 to IN6 of driving circuits Dr1 to Dr6, which in turn keeps a motor M under control.

Detecting an overcurrent in a transistor Qi where i=1, 2, 3 . . . or 6 (the reference letter i will be hereinafter used in this manner), an overcurrent detection circuit Si supplies an inactivate signal to a driving circuit Dri through an inactivation control terminal Bi, whereby the driving circuit Dri turns off the transistor Qi. Hence, the transistors Q1 to Q6 are protected against an overcurrent.

An overcurrent in a diode Di is detected by an overcurrent detection circuit Ti. Protection of the diode Di against the overcurrent is achieved in the following manner.

Figure 3:
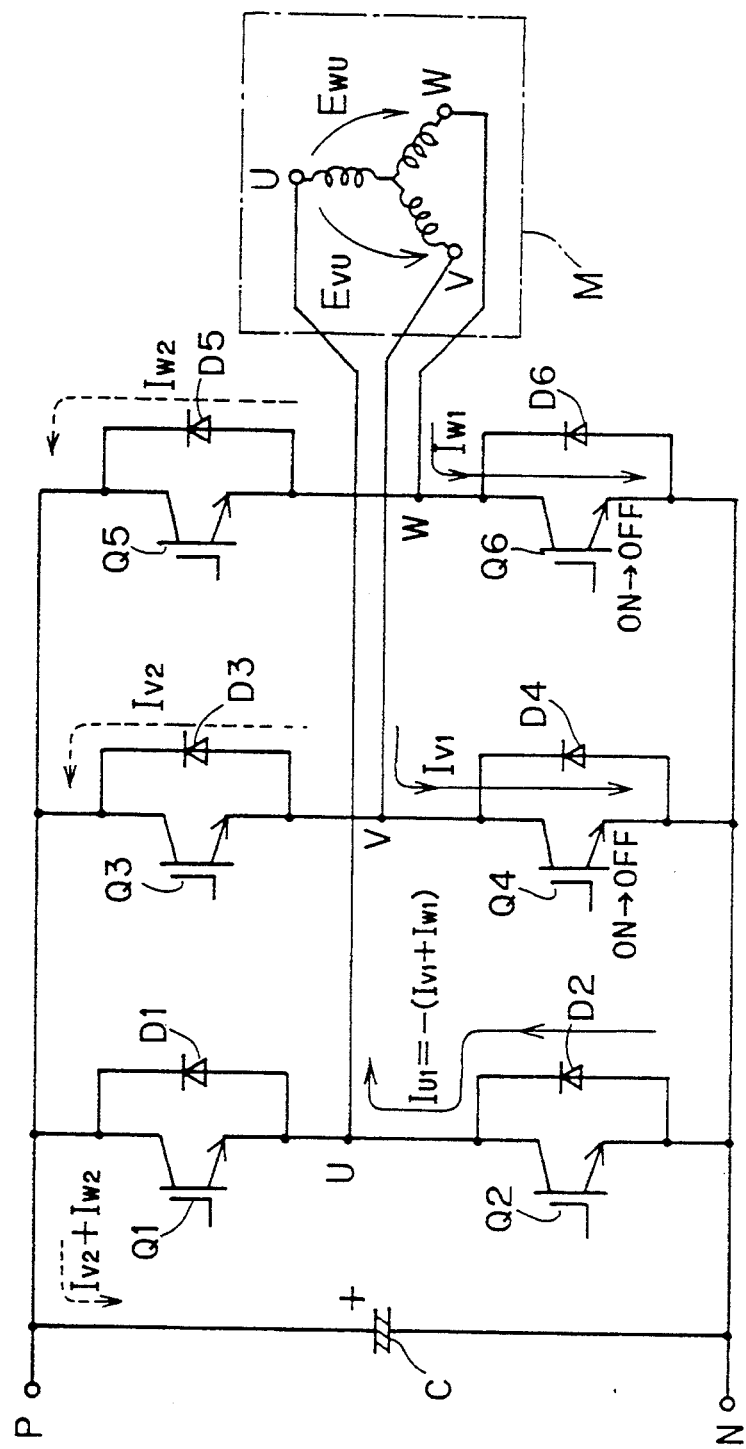
FIG. 3 is a circuitry diagram for explaining a overcurrent protection behaviors of the circuit of FIG. 2.

FIG. 3 shows an example of overcurrent protection of the diodes D1 to D6. Where a counter electromotive force is established in the motor M will be described first. Defining a potential on a U line as a reference potential, voltages developed on a V line and a W line are defined as $E_{VU}$ and $E_{WU}$, respectively. If the voltages $E_{VU}$ and $E_{WU}$ are established across the V line and the W line, respectively, initiating turn-on of the transistors Q4 and Q6, a regenerative current $I_{V1}$ and a regenerative current $I_{W1}$ will flow to the transistor Q4 and Q6, respectively (solid arrows). As a result, the diode D2 conducts a regenerative current $I_{U1}$ which flows to the U line in an amount as large as the regenerative currents $I_{V1}$ and $I_{W1}$ as combined.

A current so developed in the diode D2 is detected by the current transformer CT2 (FIG. 2). When a current across the diode D2 is twice as large as a current normaly permitted for one transistor, the overcurrent detection circuit T2 (FIG. 2) decides that the diode D2 is subjected to an overcurrent. In response to this, the control circuit 10 controls the operation of the driving circuits Dr4 and Dr6, triggering a change in the transistors Q4 and Q6 from on-state to off-state.

since the transistors Q4 and Q6 are made current starved and the diodes D4 and D6 are reverse biased by the voltages $E_{VU}$ and $E_{WU}$, the regenerative currents will not be allowed to the diodes D4 and D6, and hence, to the diode D2. Instead, a regenerative current $I_{V2}$ and a regenerative current $I_{W2}$ flow from the V line and the W line to the diodes D3 and D5, respectively (dotted arrows). The regenerative currents $I_{V2}$ and $I_{W2}$ are halves of the regenerative current $I_{U1}$ once allowed to the diode D2. The regenerative currents $I_{V2}$ and $I_{W2}$, both smaller than the regenerative current $I_{U1}$, are within the current dealing capabilities of the diodes D3 and D5. Thus, even though a current which has a level permitted by and hence which does not act as an overcurrent upon the diode D2, is equal to or less than half a similar current in the transistor Q2, the diode D2 is protected against overcurrent destruction and thermal destruction that follows.

Figure 4:
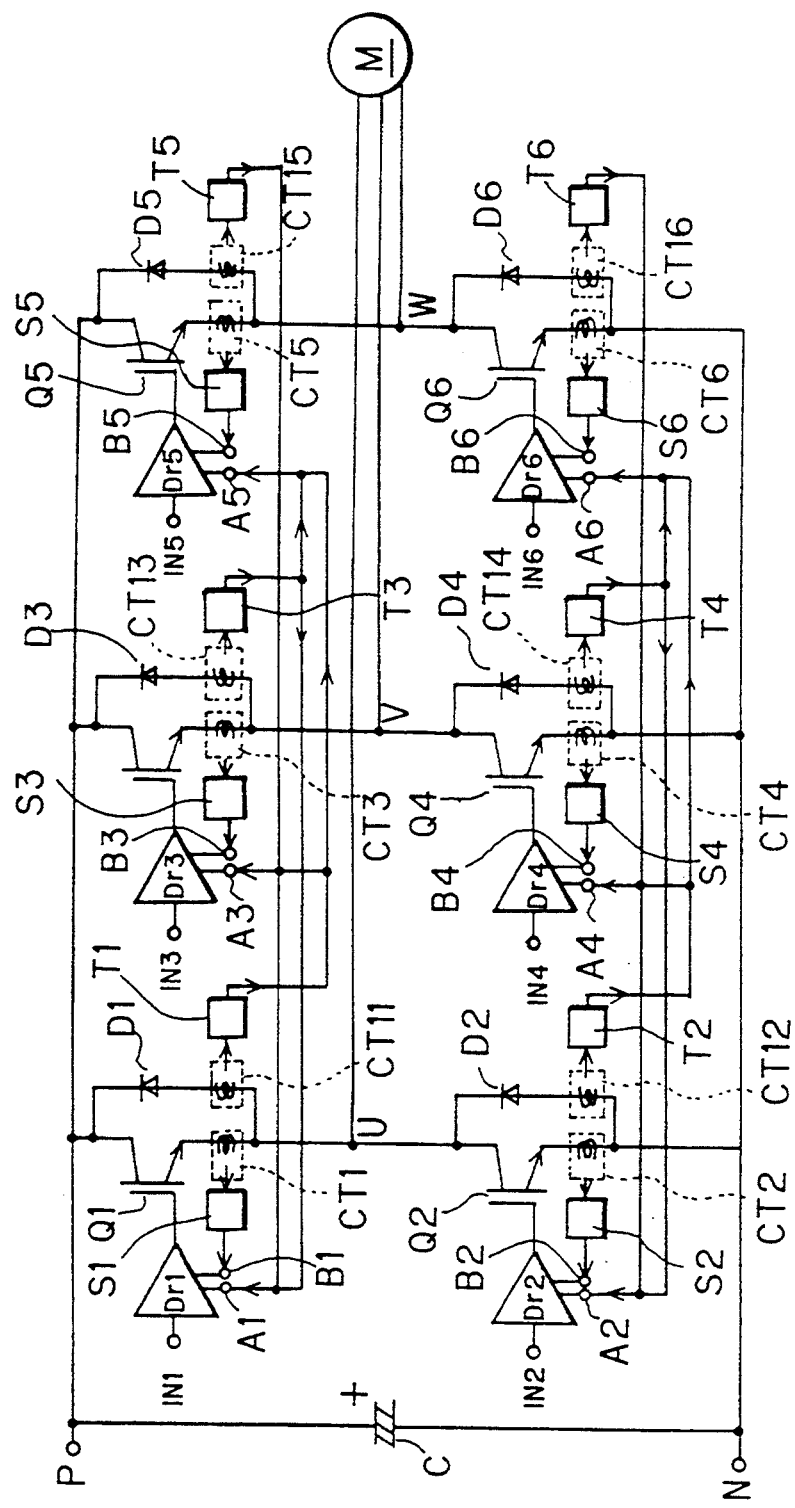
FIG. 4 is another circuitry diagram illustrating a first preferred embodiment of the present invention.

An overcurrent protective action of the control circuit 10 is achieved by providing simple connections. FIG. 4 is a circuitry diagram where a normal behaviour of the control circuit 10 is omitted. The current transformer CT1 is connected through the overcurrent detection circuit T1 to inactivation control terminals A3 and A5 of the driving circuits Dr3 and Dr6, respectively. The current transformer CT12 is connected through the overcurrent detection circuit T2 to inactivation control terminals A4 and A6 of the driving circuits Dr4 and Dr6, respectively. The current transformer CT13 is connected through the overcurrent detection circuit T3 to inactivation control terminals A1 and A5 of the driving circuits Dr1 and Dr5, respectively. The current transformer CT14 is connected through the overcurrent detection circuit T4 to the inactivation control terminals A2 and A6 of the driving circuits Dr2 and Dr6, respectively. The current transformer CT15 is connected through the overcurrent detection circuit T5 to the inactivation control terminals A1 and A3 of the driving circuits Dr1 and Dr3, respectively. The current transformer CT16 is connected through the overcurrent detection circuit T6 to the inactivation control terminals A2 and A4 of the driving circuits Dr2 and Dr4, respectively. Upon detection of an overcurrent, an inactivate signal is given to the inactivation control terminals A1 to A6. The current transformers CT1 to CT6 are connected, through the overcurrent detection circuits S1 to S6, to the inactivation control terminals B1 to B6 of the driving circuits Dr1 to Dr6, respectively.

Similarly to the conventional overcurrent protection approaches, the inactivate signal given to an inactivation control terminal Ai or Bi triggers a driving circuit Dri to disable a transistor Qi which is connected to the output terminal of the driving circuit Dri. Thus, the driving circuit Dr1 turns off the transistor Q1 in response to detection of an overcurrent not only in the transistor Q1, which it drives, but also in the diodes D3 and D5. The same is true of the driving circuits Dr2 to Dr6.

Although FIG. 3 illustrates where energies of both the regeneration currents $I_{V2}$ and $I_{W2}$ are regenerated at the capacitor C (dotted arrows), the overcurrent protection of the present invention is not limited to as illustrated FIG. 3. As far as a current permitted by the transistor Q1 is about twice as large as a current permitted by the diode D3 and/or D5, the diode D2 is protected against an overcurrent and overcurrent-induced thermal destruction even if the transistor Q1 is on and the regeneration currents $I_{V2}$ and $I_{W2}$ are flowing back to the U line.

Figure 5:
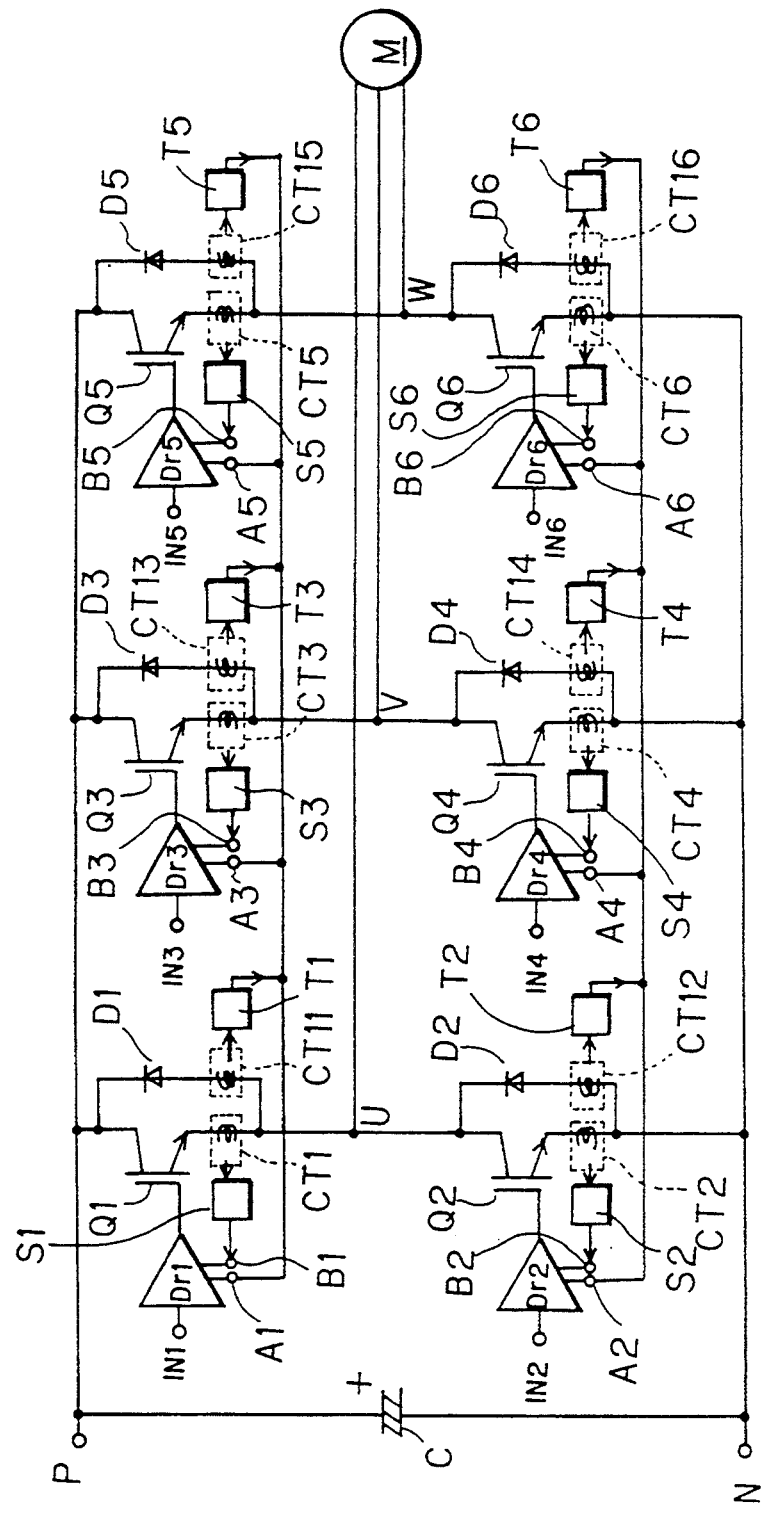
FIG. 5 is a circuitry diagram illustrating a second preferred embodiment of the present invention.

On the other hand, illustrated in FIG. 4 is where the transistors Q4 and Q6 are disabled if an overcurrent is developed in the diode D2. To obtain the same result, the transistor Q2 may be turned off together with the transistors Q4 and Q6, since no current is allowed in the transistor Q2 when the transistors Q4 and Q6 are off (second preferred embodiment). In the circuit according to the second preferred embodiment (FIG. 5), the overcurrent detection circuits T1, T3 and T5 and the inactivation control terminals A1, A3 and A5 of the driving circuits Dr1, Dr3 and Dr5 are connected with each other. Likewise, the overcurrent detection circuits T2, T4 and T6 and the inactivation control terminals A2, A4 and A6 of the driving circuits Dr2, Dr4 and Dr6 are connected with each other. Hence, if an overcurrent is developed in either the diode D1, D3 or D5 each disposed above the U, the V and the W lines, the transistors Q1, Q3 and Q5 above the lines U, V and W are equally turned off. The transistors Q2, Q4 and Q6 below the lines U, V and W will be turned off in a similar manner.

Figure 6:
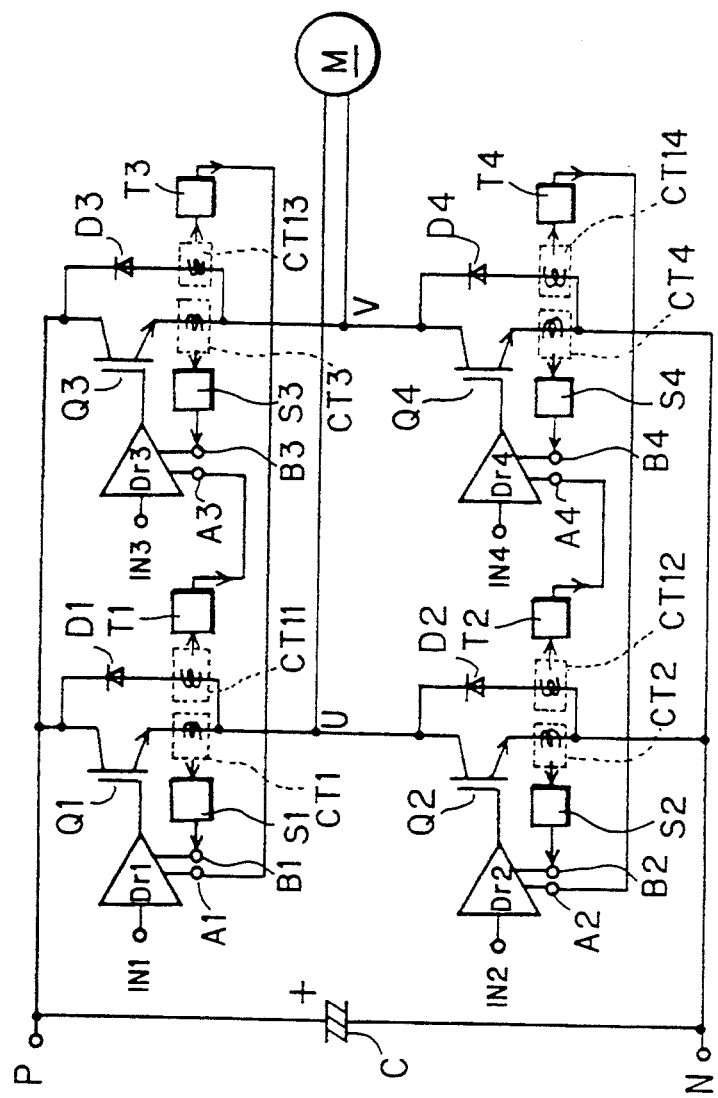
FIG. 6 is a circuitry diagram illustrating a third preferred embodiment of the present invention.

The foregoing embodiments illustrated in FIGS. 2 to 5 are related exclusively to a tri-phase load. However, the present invention is also applicable to where a mono-phase load is used. FIG. 6 shows a driving circuit according to a third preferred embodiment of the present invention. To control a mono-phase load, the driving circuit of FIG. 6 includes driving circuits Dr1 to Dr4, transistors Q1 to Q4 and diodes D1 to D4. Current transformers CT1 to CT4 and overcurrent detection circuits S1 to S4 are provided for overcurrent detection of the transistors Q1 to Q4. Current transformers CT1 to CT14 and overcurrent detection circuits T1 to T4 are provided for overcurrent detection of the diodes D1 to D4.

Connections between the overcurrent detection circuits and the inactivation control terminals are similar to those in the driving circuit of FIG. 4. The overcurrent detection circuits S1 and T3 are connected to inactivation control terminals A1 and B1 of the driving circuit Dr1, respectively. The overcurrent detection circuits S2 and T4 are connected to inactivation control terminals A2 and B2 of the driving circuit Dr2, respectively. The overcurrent detection circuits S3 and T1 are connected to inactivation control terminals A3 and B3 of the driving circuit Dr3, respectively. The overcurrent detection circuits S4 and T2 are connected to inactivation control terminals A4 and B4 of the driving circuit Dr4, respectively.

To understand overcurrent protection in the circuit of the third preferred embodiment, assume that a regenerative current flows from the V line to the transistor Q4, and flows back to the U line via the diode D2, whereby an overcurrent is developed in the diode D2. Detecting the overcurrent, the overcurrent detection circuit T2 gives an inactivate signal to the driving circuit Dr4 through the inactivation control terminal A4 so that the transistor Q4 turns off. Blocked the path to the transistor Q4, the regenerative flows from the V line to the diode D3 and thence to the transistor Q1. Since overcurrent state will emerge in the diode D3 if the regenerative is left flowing to the transistor Q1, the overcurrent detection circuit T3 gives the inactivate signal to the driving circuit Dr1 through the inactivation control terminal A1. As a result, the transistor Q1 turns off, which again allows the regenerative current flow to the diode D2. With this action repeated, the energy of the regenerative current will be attenuated. In addition, since the regenerative current flows to the diodes either D2 or D3 one at a time, current-induced heat in the diode D2 disappears while the regenerative current flows in the diode D3 or vice versa. Hence, thermal destruction of the diodes will not result.

The first to the third preferred embodiments relate to where a current transformer is used as a current sensor for both a transistor and a free wheeling diode. However, the provision of current transformers invites a disadvantage in terms of manufacturing costs of the current sensor and the overall device size.

Figure 7:
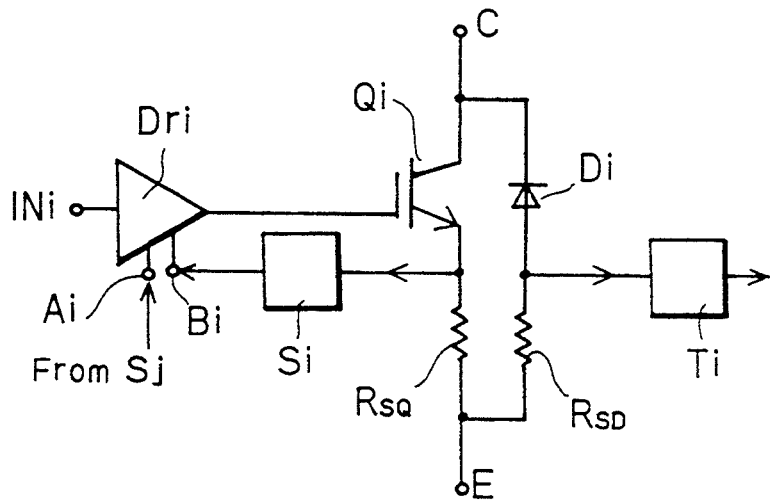
FIG. 7 is a circuitry diagram illustrating a fourth preferred embodiment of the present invention.

FIG. 7 shows an overcurrent protection device according to a fourth preferred embodiment of the present invention. The overcurrent protection device uses current detection resistors $R_{SQ}$ and $R_{SD}$ as current sensors for a transistor and a diode, respectively. Voltage drops across the current detection resistors $R_{SQ}$ and $R_{SD}$ are proportional to currents in a transistor Qi and a diode Di. Hence, it is possible to sense an overcurrent state in the transistor Qi and the diode Di by measuring the voltage drops by an overcurrent detection circuit Si and Ti, respectively. If the overcurrent detection circuit Si decides that the transistor Qi is in the overcurrent state, a driving circuit Dri turns off the transistor Qi in response to an inactivate signal received at its inactivation control terminal Bi. If an overcurrent in the diode Di is detected by an overcurrent detection circuit Tj, where j=1 to 6 (definition of the reference letter j is the same as that of the reference letter i), the driving circuit Dri turns off the transistor Qi in response to the inactivate signal received at its other inactivation control terminal Ai. In protecting the transistor Qi, if the inactivate signal is given from all the overcurrent detection circuits T1 to T6 including the overcurrent detection circuit Ti which is associated with the transistor Qi, the overcurrent protective action corresponds to that of the first preferred embodiment. The overcurrent protection of the second preferred embodiment corresponds to where the inactivate signal is given from the overcurrent detection circuit Tj excluding the overcurrent detection circuit Ti.

Figure 8:
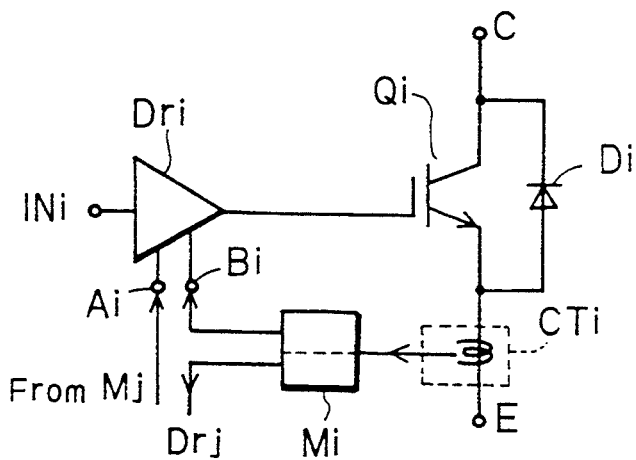
FIG. 8 is a circuitry diagram illustrating a fifth preferred embodiment of the present invention.
Figure 9:
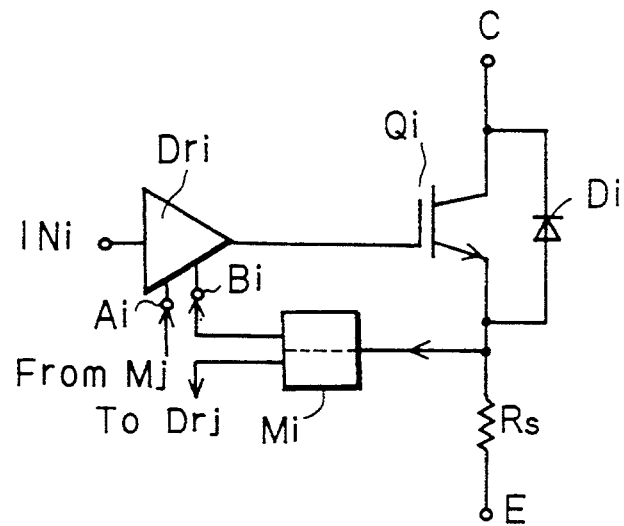
FIG. 9 is a circuitry diagram illustrating a sixth preferred embodiment of the present invention.

Taking an advantage of the transistor-diode reverse-parallel connection, the current sensor can be used in overcurrent detection for both the transistor and the diode. FIG. 8 shows a fifth preferred embodiment where a current transformer CTi is used as a current sensor and FIG. 9 shows a sixth preferred embodiment of the present invention where a current detection resistor $R_S$ is used as a current sensor. The both preferred embodiments require that a collector of a transistor Qi and a cathode of a diode Di are connected with each other while an emitter of the transistor Qi and an anode of the diode Di are connected with each other and that the current sensor is disposed on a current path which is common to the transistor Qi and the diode Di. On the common current path, a current flow direction of when the transistor Qi carries a current is opposite to that of when the diode Di carries a current. Hence, by finding whether a current sensed by the current sensor has a positive polarity or a negative polarity, an overcurrent detection circuit Mi separately detects a current in the transistor Qi and a current in the diode Di. Detecting an overcurrent in the transistor Qi, the overcurrent detection circuit Mi orders a driving circuit Dri to turn off the transistor Qi. The overcurrent detection circuit Mi gives the inactivate signal to a driving circuit Drj upon detection of an overcurrent in the diode Di. If the inactivate signal is given from all the overcurrent detection circuits including the overcurrent detection circuit Mi which is associated with the transistor Qi, the overcurrent protective action corresponds to that of the first preferred embodiment. The overcurrent protection of the second preferred embodiment corresponds to where the inactivate signal is given from the overcurrent detection circuits excluding the overcurrent detection circuit Mi.

Figure 10:
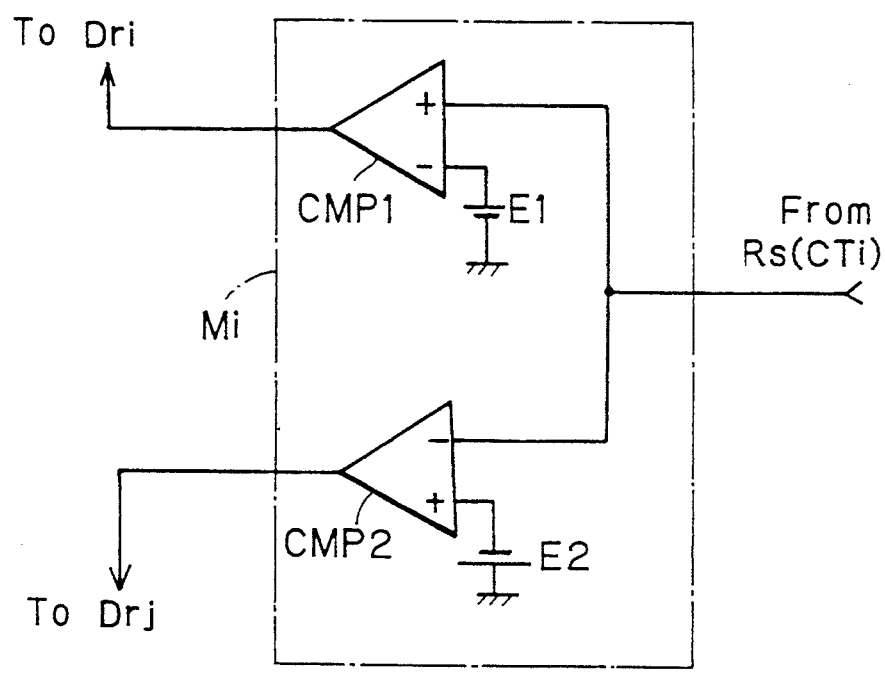
FIG. 10 is a circuitry diagram showing the structure of an overcurrent detection circuit Mi.

The overcurrent detection circuit Mi is illustrated in more detail in FIG. 10. A voltage obtained at the overcurrent detection resistor RS or a current transformer CTi is given to a positive input terminal of a comparator CMP1 and a negative input terminal of a comparator CMP2. A negative input terminal of the comparator CMP1 receives a reference potential E1 (E1>0) while a positive input terminal of the comparator CMP2 receives a reference potential E2 (E2<0). It is decided that an overcurrent is present in the diode if the voltage available at the overcurrent detection resistor $R_S$ or a current transformer CTi is greater than reference potential E1, whereas it is decided that an overcurrent is present in the transistor if the voltage at the element $R_S$ or Cti is smaller than the reference potential E2. Signals representing the detection results are independently outputted from the two comparators.

Figure 11:
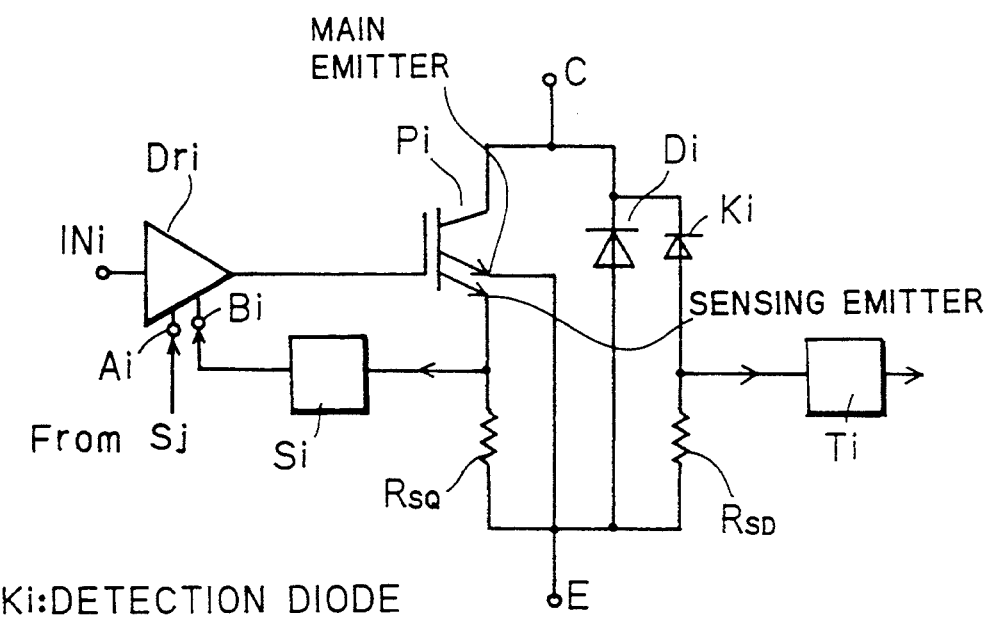
FIG. 11 is a circuitry diagram illustrating a seventh preferred embodiment of the present invention.

Using the overcurrent detection resistors, the circuits of the preferred embodiments invite an increased power loss. The disadvantage, however, is eliminated by disposing a detection diode Ki in parallel with a protection diode Di and detecting a current passed by the detection diode Ki, as shown in FIG. 11 (seventh preferred embodiment). In this case, the overcurrent detection resistor $R_{SD}$ must be connected in series with the detection diode Ki. Alternately, a current sensing IGBT (Pi) may be provided which has a main emitter for controlling a load and a sensing emitter for detecting a current. If the transistor Pi is used, the overcurrent detection resistor $R_{SQ}$ must be connected to the sensing emitter so as to constrain power consumption at the overcurrent detection resistor $R_{SQ}$.

Figure 12:
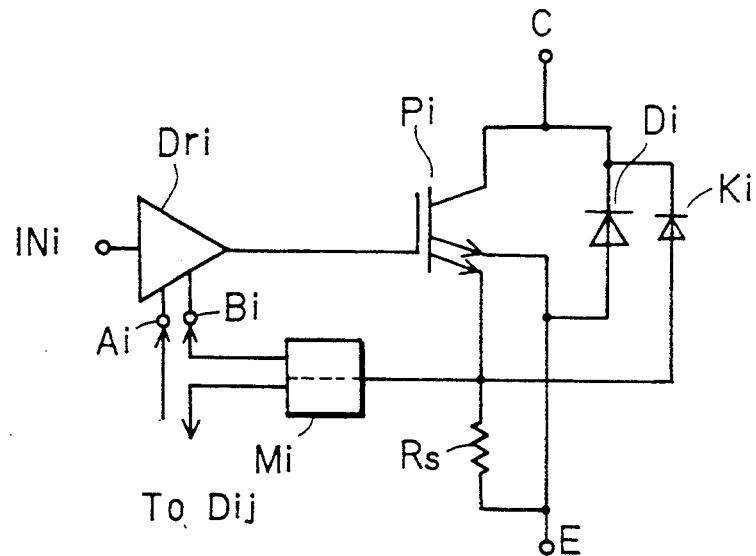
FIG. 12 is a circuitry diagram illustrating an eighth preferred embodiment of the present invention.

Other modifications is also possible such as wherein the overcurrent detection resistor $R_S$ detects both a current developed in the transistor Pi and a current developed in the diode Ki (FIG. 12, eighth preferred embodiment). In the eighth preferred embodiment, the main emitter of the transistor Pi, the anode of the protection diode Di and one terminal of the overcurrent detection resistor $R_S$ are connected with each other while the sensing emitter of the transistor Pi, the anode of the protection diode Ki and the opposite terminal of the overcurrent detection resistor $R_S$ are connected with each other.

The preferred embodiments heretofore described require that an IGBT are used as a switching device. However, the effects of the present invention herein disclosed will be also obtained by using a power switching device, be it a bipolar transistor or a MOSFET.

Although the foregoing has also described that a current sensing IGBT is used to detect a current developed in the switching device, the present invention is also applicable to where any other switching device is employed as far as the switching device incorporates a current detection terminal. A current sensing MOSFET, too, is therefore a good alternative.

While the invention has been shown and described in detail, the foregoing description is in all aspects illustrative and not restrictive. It is understood that numerous modifications and variations can be devised without departing from the scope of the invention.

What is claimed is:

1. An overcurrent detection device, comprising:
   a switching element having a first current electrode, a second current electrode and a control electrode, said switching element passing a current from said first current electrode to said second current electrode;
   a protection diode having a cathode connected to said first current electrode and an anode connected to said second current electrode;
   a detection diode having a cathode connected to said first current electrode and an anode connected to said second current electrode, said detection diode passing a current which is smaller than a current flowing in said protection diode;
   a first evaluation circuit for evaluating the current flowing in said detection diode; and
   a second evaluation circuit for evaluating the current flowing in said switching element.

2. The overcurrent detection device of claim 1, wherein said switching element further comprises a current detection electrode, and a current smaller than the current flowing from said first current electrode to said second current electrode flows from said first current electrode to said current detection electrode.

3. The overcurrent detection device of claim 2, wherein said second evaluation circuit measures the current flowing from said first current electrode to said current detection electrode and evaluates the current flowing in said switching element.

4. The overcurrent detection device of claim 3, wherein said first evaluation circuit comprises:
   a first resistor connected to said anode of said detection diode, said first resistor passing the current which flows in said detection diode; and
   first voltage drop detecting means for detecting a voltage drop at said first resistor.

5. The overcurrent detection device of claim 3, wherein said second evaluation circuit comprises:
   a second resistor connected to said current detection electrode, said second resistor passing the current which flows from said first current electrode to said current detection electrode; and
   second voltage drop detecting means for detecting a voltage drop at said second resistor.

6. The overcurrent detection device of claim 2, wherein said first and said second evaluation circuits comprises:
   a resistor connected to said anode of said detection diode and to said current detection electrode, said resistor passing the current which flows in said detection diode and passing the current which flows from said first current electrode to said current detection electrode.

7. The overcurrent detection device of claim 6, wherein said first and said second evaluation circuits further comprises:
   a voltage drop detecting means for detecting a voltage drop at said resistor.

* * * * *